United States Patent
Laine

(10) Patent No.: US 8,995,231 B2
(45) Date of Patent: Mar. 31, 2015

(54) OSCILLATOR IN LIQUID

(75) Inventor: Arto Laine, Tampere (FI)

(73) Assignee: Patria Aviation Oy, Halli (FI)

( * ) Notice: Subject to any disclaimer, the term of this patent is extended or adjusted under 35 U.S.C. 154(b) by 750 days.

(21) Appl. No.: 13/142,503

(22) PCT Filed: Dec. 29, 2009

(86) PCT No.: PCT/FI2009/051049
§ 371 (c)(1),
(2), (4) Date: Jun. 28, 2011

(87) PCT Pub. No.: WO2010/076391
PCT Pub. Date: Jul. 8, 2010

(65) Prior Publication Data
US 2011/0266085 A1 Nov. 3, 2011

(30) Foreign Application Priority Data

Dec. 31, 2008 (FI) .................................... 20086257

(51) Int. Cl.
*H04R 17/00* (2006.01)
*G10K 9/12* (2006.01)
*G01V 1/145* (2006.01)

(52) U.S. Cl.
CPC ............... *G10K 9/121* (2013.01); *G01V 1/145* (2013.01)
USPC ............................ 367/160; 367/171; 367/163

(58) Field of Classification Search
CPC ................................ G10K 9/121; G01V 1/145
USPC .......... 381/162; 367/140, 141, 155, 162, 163, 367/171, 160
See application file for complete search history.

(56) References Cited

U.S. PATENT DOCUMENTS

| | | | | |
|---|---|---|---|---|
| 3,258,738 A | * | 6/1966 | Merchant | 367/155 |
| 3,274,537 A | * | 9/1966 | Toulis | 367/155 |
| 4,344,503 A | * | 8/1982 | Nakamura et al. | 181/170 |
| 4,410,768 A | * | 10/1983 | Nakamura et al. | 381/423 |
| 4,552,243 A | * | 11/1985 | Melillo et al. | 181/169 |
| 4,646,874 A | * | 3/1987 | Baitcher et al. | 181/169 |
| 4,862,429 A | * | 8/1989 | Rolt | 367/165 |
| 4,932,008 A | * | 6/1990 | Rolt | 367/165 |
| 4,964,106 A | * | 10/1990 | Bromfield | 367/165 |
| 5,016,228 A | | 5/1991 | Arnold et al. | |
| 5,136,556 A | * | 8/1992 | Obara | 367/163 |

(Continued)

FOREIGN PATENT DOCUMENTS

| | | |
|---|---|---|
| EP | 0 363 032 A2 | 4/1990 |
| EP | 0 421 613 A2 | 4/1991 |
| FR | 2 740 276 A1 | 4/1997 |
| WO | WO 87/05772 A1 | 9/1987 |
| WO | WO 97/41454 A1 | 11/1997 |

*Primary Examiner* — Luke Ratcliffe
*Assistant Examiner* — Hovhannes Baghdasaryan
(74) *Attorney, Agent, or Firm* — Birch, Stewart, Kolasch & Birch, LLP

(57) ABSTRACT

A oscillator in a liquid includes an actuator element oscillating in a reciprocating manner, and a sound-producing element attached to the actuator element, whereby the actuator element generates a motion in the sound-producing element for producing a sound. The oscillator is made open, whereby the pressure of liquid acts both on a first surface and on a second surface of the wall of the sound-producing element while the sound source is in the liquid. The material and/or structure of the wall of the sound-producing element is provided to be such that the distance between the first surface and the second surface of the wall varies as sound is produced.

15 Claims, 1 Drawing Sheet

(56) References Cited

U.S. PATENT DOCUMENTS

| | | | | |
|---|---|---|---|---|
| 5,291,461 A | * | 3/1994 | Boeglin et al. | 367/163 |
| 5,319,718 A | * | 6/1994 | Yocum | 381/398 |
| 5,363,346 A | * | 11/1994 | Maltby | 367/163 |
| 5,497,357 A | | 3/1996 | Dahlstrom et al. | |
| 5,757,728 A | * | 5/1998 | Tenghamn et al. | 367/163 |
| 5,768,216 A | | 6/1998 | Obata et al. | |
| 5,959,939 A | * | 9/1999 | Tengham et al. | 367/174 |
| 6,076,629 A | | 6/2000 | Tengham | |
| 6,097,829 A | * | 8/2000 | Guenther et al. | 381/425 |
| 6,298,012 B1 | * | 10/2001 | Benjamin | 367/174 |
| 6,956,792 B1 | | 10/2005 | Osborn et al. | |
| 2001/0043714 A1 | * | 11/2001 | Asada et al. | 381/399 |
| 2002/0191803 A1 | * | 12/2002 | Asada et al. | 381/152 |
| 2002/0191807 A1 | * | 12/2002 | Asada et al. | 381/335 |
| 2003/0228027 A1 | * | 12/2003 | Czerwinski | 381/342 |
| 2004/0140737 A1 | | 7/2004 | Barillot et al. | |
| 2005/0008174 A1 | * | 1/2005 | Laine | 381/162 |
| 2007/0056795 A1 | * | 3/2007 | Cox et al. | 181/111 |
| 2008/0137902 A1 | * | 6/2008 | Bohlender et al. | 381/420 |

\* cited by examiner

OSCILLATOR IN LIQUID

BACKGROUND OF THE INVENTION

The invention relates to an oscillator in a liquid comprising an actuator element oscillating in a reciprocating manner, whereby the distance between the ends of the actuator element varies, and a sound-producing element attached to the actuator element, whereby the actuator element generates a motion in the sound-producing element for producing a sound, the oscillator being provided open, whereby liquid pressure acts both on a first surface and on a second surface of the wall of the sound-producing element while the oscillator is in the liquid.

A typical underwater sound source includes an actuator oscillating in a reciprocating manner such that the distance between the actuator ends varies. At the actuator ends there is attached a sound-producing element, whereby the actuator, while oscillating in a reciprocating manner, generates a motion in the sound-producing element such that a sound will be produced. Underwater sound sources of this kind are disclosed, for instance, in publications U.S. Pat. No. 5,016,228, U.S. Pat. No. 5,497,357 and U.S. Pat. No. 6,076,629. Typically the sound sources are encapsulated such that water is not able to penetrate inside the sound-producing element. The tightness of the sound source encapsulation is thus subjected to high standards. Pressure compensation in the interior of the sound source may require complicated equipment. Further, to make the encapsulated structure sufficiently sturdy to resist external impacts, for instance produced by an explosion, is extremely challenging, and therefore the encapsulated solution is quite expensive to manufacture. There are also known sound sources having an open structure, in which the pressure of water will be able to act on both sides of the sound-producing element. However, at low frequencies the efficiency of these solutions to produce sound is not sufficient for most uses.

BRIEF DESCRIPTION OF THE INVENTION

The object of the present invention is to provide an oscillator of a new type locating in a liquid.

The oscillator of the invention is characterized in that the material and/or structure of a wall of a sound-producing element is provided to be such that the distance between the first surface and the second surface of the wall varies as sound is produced.

The basic idea of the invention is that the oscillator locating in a liquid comprises an actuator element, which oscillates in a reciprocating manner, and a sound-producing element, which is attached to the actuator element, whereby the actuator element generates a motion in the sound-producing element for producing a sound. Further, the oscillator is provided to be open, whereby liquid pressure acts both on the first surface and on the second surface of the wall of the sound-producing element while the sound source is in the liquid. The material and/or structure of the wall of the sound-producing element is provided such that as sound is being produced, the distance between the first surface and the second surface of the wall varies. Because of the open structure the oscillator is simple, reliable in operation and durable. Because of the structure and/or material of the wall it is possible to produce sound efficiently with the oscillator also at low frequencies.

The basic idea of an embodiment of the invention is that a wall of a sound-producing element comprises a more rigid layer and a flexible layer associated therewith. The flexible layer advantageously comprises gas the pressure of which varies as sound is produced.

The basic idea of a second embodiment of the invention is that the material of the flexible layer has a closed-cell structure. The basic idea of a third embodiment of the invention is that the material of the flexible layer is open-cell material that is encased to be watertight.

The basic idea of yet another embodiment of the invention is that the flexible layer has a honeycomb structure which enables variation in the distance between an outer surface and an inner surface.

BRIEF DESCRIPTION OF THE DRAWINGS

The invention is described in greater detail with reference to the attached drawings, in which.

For the sake of clarity, some embodiments of the invention are shown in a simplified manner in the figures. Like reference numerals refer to like parts in the figures.

DETAILED DESCRIPTION OF THE INVENTION

Figure 1:
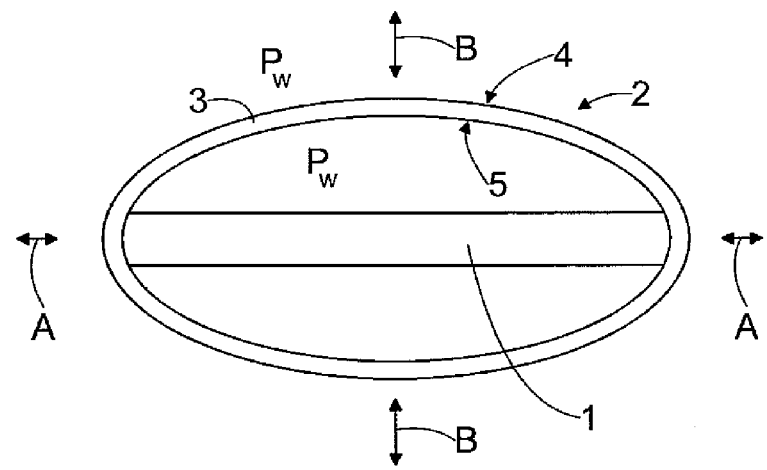
FIG. 1 is a schematic side view of an oscillator.

FIG. 1 shows an oscillator that is preferably an underwater sound source. The oscillator includes an actuator element 1. The actuator element 1 may be, for instance, a piezoceramic or a magnetostrictive actuator. The actuator element may consist of a bar or bars that may thus be magnetostrictive or piezoceramic bars made of an appropriate material. If necessary, the bar may be divided into a number of shorter bars and there may be several bars side by side. Further, the actuator element 1 comprises means for controlling an electric or magnetic field to act on the bar such that the bar becomes shorter and longer in the longitudinal direction, i.e. the mutual distance between the ends of the actuator element 1 varies, i.e. the actuator element 1 oscillates.

At the ends of the actuator element 1 there is attached a sound-producing element 2 that is elliptic in side view. The actuator element 1 and the sound-producing element 2 are interconnected such that as the actuator element 1 oscillates in the manner illustrated by arrows A, the wall 3 of the sound-producing element 2 moves in the manner illustrated by arrows B. In the solution of FIG. 1, the motion of the actuator element 1 in the direction of the longer axis of the ellipse is thus transmitted as a broader motion perpendicular to said direction of the sound-producing element 2. The sound is thus produced by the motion of the sound-producing element 2 as illustrated by arrows B. The frequency of the produced sound may be 50 to 5000 Hz, for instance. Instead of an elliptic shape, the sound-producing element 2 may have, for instance, a rectangular or a polygonal shape in side view, or its walls may be concave, i.e. inwardly curved. Further, the sound-producing element 2 may be a plane or a plate that the actuator element moves in a reciprocating manner so as to produce sound. The plate may be angular, round or elliptic, for instance.

The structure of the oscillator is open. Consequently, the pressure of water $P_w$ acts both on the outer surface 4 and on the inner surface 5 of the wall 3 of the sound-producing element 2 while the oscillator is under water. So, the open structure eliminates a need for separate pressure compensation, because, in practice, the pressure acting on the inner surface 5 fully compensates for the pressure acting on the outer surface 4. If in the oscillator having an open structure the sound-producing element 2 is a plate, the pressure of water acts both on the front surface and on the rear surface of the wall 3 of the sound-producing element 2.

Figure 2:
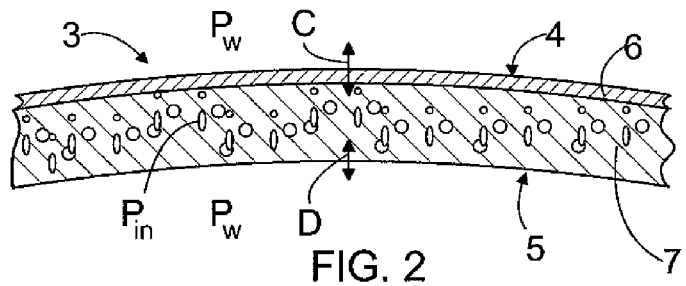
FIG. 2 is a schematic side view of a wall structure of a sound-producing element cut open.

FIG. 2 shows a structure of the wall 3 of the sound-producing element 2 in the oscillator. When the wall 3 of the sound-producing element 2 moves in order to produce sound, the distance between the outer surface 4 and the inner surface 5 varies. Oscillation of the outer surface 4 is thus not fully transmitted to the inner surface 5, which is illustrated by arrows C and D in FIG. 2. In other words, the inner surface 5 does not move with the outer surface 4 at the same time and the same amount. As sound is produced, the thickness of the wall 3 thus varies. At the maximum, the variation in thickness equals to the peak amplitude of oscillation.

The desired function may be provided, for instance, by the embodiment of FIG. 2, in which the wall 3 of the sound-producing element comprises a sound-producing layer 6 and a flexible layer 7. The sound-producing layer 6 may be made of metal, for instance, but most preferably the sound-producing layer 6 is made of plastic composite, such as carbon fibres or glass fibre.

In the embodiment of FIG. 2 the flexible layer 7 is made of closed-cell foamed material. Examples of this material include closed-cell foamed polyvinylchloride and closed-cell foamed polyethylene. These foamed materials comprise gas in their cellular structure, whereby the flexible layer 7 comprises gas, such as air, substantially evenly distributed. The gas may also be, for instance, nitrogen or some other suitable, preferably inert, gas. When the oscillator is in liquid and produces sound, the pressure of gas $P_{in}$ in the flexible layer 7 varies, because the gas in the flexible layer 7 compresses more easily than the water surrounding the sound-producing element.

The material of the flexible layer 7 is preferably so-called memory material. The memory material is, for instance, polymeric material whose loss to storage module ratio is as high as possible. Oscillation is transmitted through the memory material attenuated and in a different phase.

Figure 3:
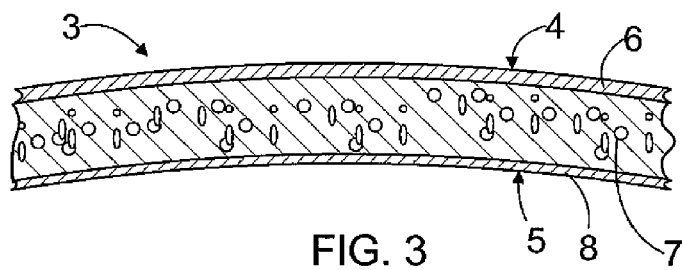
FIG. 3 is a schematic side view of a wall structure of a second sound-producing element cut open and FIG. 4 is a schematic side view of a wall structure of a third sound-producing element cut open.

In the embodiment of FIG. 3, the flexible layer 7 is of open-cell material. Consequently, the flexible layer 7 shall be encased tightly, so a sealing layer 8, for instance of rubber, may be arranged around the flexible layer. The sound-producing layer 6 may also be tight, and in that case there is no need to arrange a sealing layer 7 on the exterior of the flexible layer 8.

Figure 4:
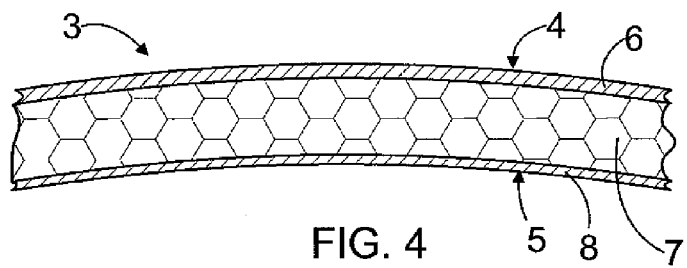

In the solution of FIG. 4, the flexible layer 7 consists of a honeycomb structure. The honeycomb structure enables variation in the distance between the outer surface 4 and the inner surface 5, i.e. variation in the thickness of the wall 3 of the sound-producing element 2.

It is not necessary for the flexible layer 7 to contain solid material at all, but the flexible layer 7 may also consist of gas, whereby a gas layer is located between the sound-producing layer 6 and the sealing layer 8.

The length of the oscillator in the axial direction of the actuator element 1 may be within the range of 4 to 150 cm. The thickness of the sound-producing layer 6 of the wall 3 in the sound-producing element 2 may be 3 to 50 mm, for instance. The flexible layer 7 may in turn be 0.5 to 10 times thicker than the sound-producing layer 6. Naturally, the thicknesses of the layers depend on the elastic moduli and/or densities of the materials used.

In some cases the features disclosed in this application may be used as such, irrespective of other features. On the other hand, the features disclosed in this application may be combined, when necessary, to provide various combinations.

The drawings and the relating description is only intended to illustrate the inventive idea. The details of the invention may vary within the scope of the claims. So, the oscillator need not necessary be located in water, but it may also be in some other liquid, such as oil. Thus, the oscillator may be, for instance, in oil, which in turn may be separated from the water by a polymeric/rubber film. A solution of this kind reduces considerably a problem posed by corrosion.

The invention claimed is:

1. An oscillator in a liquid comprising:
   an actuator element oscillating in a reciprocating manner, whereby the distance between the ends of the actuator element varies, and a sound-producing element attached to the actuator element,
   whereby the actuator element generates a motion in the sound-producing element for producing a sound,
   the oscillator being provided open, whereby liquid pressure acts both on a first surface and on a second surface of the wall of the sound-producing element while the oscillator is in the liquid,
   wherein the sound-producing element is structurally configured to comprise a flexible layer in a manner such that the distance between the first surface and the second surface of the wall varies as sound is produced;
   wherein the sound-producing element is structurally configured in a manner such that the first surface and the second surface of the wall oscillate independently out of phase with each other as sound is produced.

2. The oscillator of claim 1, wherein the wall of the sound-producing element comprises a more rigid layer producing sound and a more elastic flexible layer associated therewith.

3. The oscillator of claim 2, wherein the flexible layer contains gas.

4. The oscillator of claim 2, wherein the material of the flexible layer has a closed-cell structure.

5. The oscillator of claim 2, wherein the material of the flexible layer is open-cell material and that a sealing layer is arranged around the flexible layer.

6. The oscillator of claim 2, wherein the flexible layer has a honeycomb structure.

7. The oscillator of claim 1, wherein the oscillator is an underwater sound source.

8. The oscillator of claim 3, wherein the material of the flexible layer has a closed-cell structure.

9. The oscillator of claim 3, wherein the material of the flexible layer is open-cell material and that a sealing layer is arranged around the flexible layer.

10. The oscillator of claim 3, wherein the flexible layer has a honeycomb structure.

11. The oscillator of claim 2, wherein the oscillator is an underwater sound source.

12. The oscillator of claim 3, wherein the oscillator is an underwater sound source.

13. The oscillator of claim 4, wherein the oscillator is an underwater sound source.

14. The oscillator of claim 5, wherein the oscillator is an underwater sound source.

15. The oscillator of claim 6, wherein the oscillator is an underwater sound source.

* * * * *